US010331511B1

(12) United States Patent
Callau

(10) Patent No.: US 10,331,511 B1
(45) Date of Patent: Jun. 25, 2019

(54) POISON PILL PREVENTION FOR CONSENSUS PROTOCOLS

(71) Applicant: Amazon Technologies, Inc., Seattle, WA (US)

(72) Inventor: Carlos Vara Callau, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 201 days.

(21) Appl. No.: 14/625,504

(22) Filed: Feb. 18, 2015

(51) Int. Cl.
*G06F 11/07* (2006.01)

(52) U.S. Cl.
CPC ...... *G06F 11/0793* (2013.01); *G06F 11/0709* (2013.01)

(58) Field of Classification Search
CPC ............. H04L 2463/061; H04L 63/068; H04L 2209/80; H04L 41/5003; H04L 9/0844; H04L 67/16; H04L 67/42; H04L 12/14; H04L 12/1485; H04L 29/1216; H04L 41/06; H04L 41/0893; H04L 41/5006; H04L 41/5009; G06Q 40/12; G06Q 10/10; G06Q 30/06; G06Q 20/102; G06Q 20/367; G06Q 40/00; G06Q 40/08; G06Q 30/02; G06Q 30/0215; G06Q 20/06; G06Q 20/0855; G06Q 20/382; G06Q 20/3821; G06Q 20/38215; H04W 4/24; H04W 12/06; H04W 88/02; H04W 8/18; H04W 12/04; H04W 4/00; H04W 4/001; H04W 8/265; H04W 24/08; H04W 88/08; H04W 28/0236; H04W 4/12; H04W 4/16; H04W 4/20; H04W 76/02; H04W 88/06
USPC ....... 709/207, 217, 219, 223, 203, 224, 229, 709/238, 240, 242, 246, 250; 707/E17.014, 769, 999.107, E17.002, 707/E17.005, E17.008, E17.009, E17.019, 707/694, 700, 706, 722, 741, 770, 781, 707/782, 999.003, 999.009, 999.1, 707/999.103; 705/4, 26.1, 35, 64, 14.17, 705/14.23, 14.71, 1.1, 30, 39, 40, 65, 705/14.1, 14.25, 14.45, 14.65, 2, 21, 26.2,
(Continued)

(56) References Cited

U.S. PATENT DOCUMENTS 7,620,680 B1 11/2009 Lamport
2007/0033247 A1* 2/2007 Martin .................... G06F 9/465
709/201

(Continued)

OTHER PUBLICATIONS https://web.archive.org/web/20150213013303/http://en.wikipedia.org/wiki/Paxos_(computer_science), Paxos (computer Science) Jan. 19, 2015, Wikipedia.*

(Continued)

*Primary Examiner* — Chris Parry
*Assistant Examiner* — Chouat Abderrahmen
(74) *Attorney, Agent, or Firm* — Davis Wright Tremaine LLP

(57) ABSTRACT

A distributed system uses a consensus protocol to maintain a data set shared by nodes of the distributed system. When a change is proposed to the data set, the change must pass multiple tests, including a test regarding the validity of the proposed change according to the consensus protocol and a test regarding the validity of the proposed change according to an application that utilizes the data set. As a result, poison pills that could harm operation of the distributed system are prevented from being accepted, regardless of whether such poison pills would satisfy any conditions of the consensus protocol.

21 Claims, 8 Drawing Sheets

(58) Field of Classification Search
USPC ...... 705/26.41, 26.5, 26.61, 3, 311, 32, 326, 705/328, 37, 41, 44, 51, 53, 54, 69, 75, 705/76, 78, 7.27, 7.36, 80
See application file for complete search history.

(56) References Cited

U.S. PATENT DOCUMENTS

| | | | |
|---|---|---|---|
| 2009/0150566 A1* | 6/2009 | Malkhi | H04L 67/34 709/242 |
| 2009/0313500 A1* | 12/2009 | Butterworth | G06F 11/1438 714/11 |

OTHER PUBLICATIONS

Matlab, "Validating Property and Input Values", Sep. 2011, Mathworks, pp. 1-2 https://www.mathworks.com/help/matlab/matlab_prog/validate-property-and-input-values.html (Year: 2011).*

Ben-Or, M., "Another Advantage of Free Choice: Completely Asynchronous Agreement Protocols," Proceedings of the 2nd ACM Symposium on Principles of Distributed Computing, Montreal, Quebec, Aug. 17-19, 1983, 4 pages.

Chandra, T. D., et al., "Unreliable Failure Detectors for Reliable Distributed Systems," Journal of the ACM, 43(2):225-267, Mar. 1996.

Lamport, L., "The Part-Time Parliament," ACM Transactions on Computer Systems, 16(2):133-169, May 1998.

Song, Y. J., et al., "The Building Blocks of Consensus," Proceedings of the Ninth International Conference on Distributed Computing and Networking (ICDCN 08), Kolkata, India, Jan. 5-8, 2008, 12 pages.

* cited by examiner

US 10,331,511 B1

POISON PILL PREVENTION FOR CONSENSUS PROTOCOLS

BACKGROUND

In distributed systems, different nodes of the distributed system (e.g., computer systems in a network) may operate in connection with the same set of data. Such nodes may operate relatively independently and, generally, the operation of a node can cause changes to data used by other nodes. In distributed systems, numerous issues can arise, such as node failure, erroneous operation, simultaneous or near simultaneous changes to data made by different nodes, and the like. Consensus protocols allow for data consistency in such distributed systems to protect and/or mitigate against such issues. While consensus protocols provide significant advantages for distributed systems, their use can have adverse effects. For instance, errors in data (often referred to as "poison pills") may, by implementation of a consensus protocol, propagate throughout a distributed system. While the data may be valid from the point of view of a consensus protocol, the data may be invalid from the perspective of an application that utilizes the data. Depending on the nature of such data, such propagation of erroneous data can have adverse effects, such as by rendering a distributed system unreliable and, in some cases, inoperable.

BRIEF DESCRIPTION OF THE DRAWINGS

Various embodiments in accordance with the present disclosure will be described with reference to the drawings, in which.

DETAILED DESCRIPTION

Figure 1:
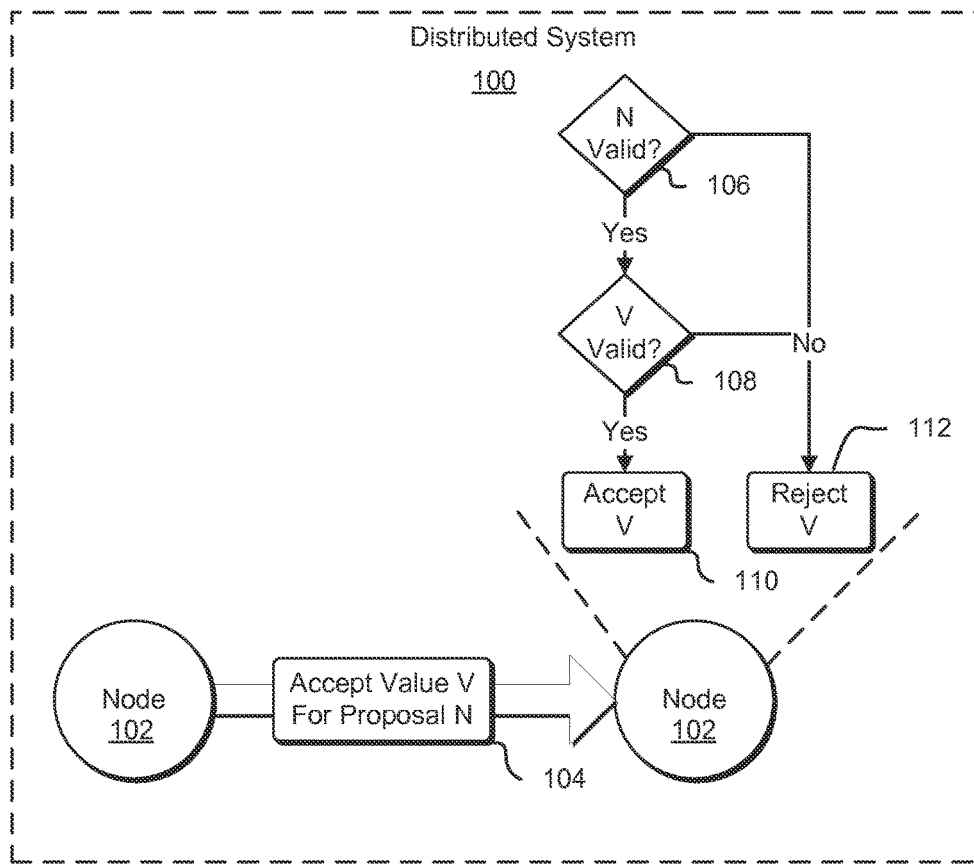
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enhancements to computer systems that utilize consensus protocols to prevent against acceptance of poison pills through implementations of consensus protocols. In an embodiment, a computer system participating in a distributed system and implementing a consensus protocol with respect to data utilized by nodes in the distributed system, utilizes application-level logic to determine the validity of a proposed change to data in addition to logic for determining whether the change is valid in accordance with the consensus protocol. The computer system rejects the proposed change if the proposed change is invalid according to the application-level logic or the consensus protocol (or both). In other words, the computer system accepts only proposed changes to data that are valid in accordance with both application-level logic and the consensus protocol.

The application-level logic may be configured for the purpose of ensuring that proposed changes to data are suitable for use by an application. For example, certain changes to a data set may cause undesired application behavior, such as the application becoming inoperable or in an undesired state. Such changes may, for instance, cause data to be in an invalid state and the application may not be configured to handle the invalid state. Accordingly, the application-level logic may be configured to test a proposed change to data to prevent changes to data causing invalid states or otherwise causing undesired application behavior. In this manner, even if a proposed change is valid in accordance with rules of a consensus protocol, the proposed change may be rejected due to non-compliance with the application-level logic, thereby preventing at least some causes of application failure. Further, because of the application-level check of proposed changes to a data set performed by nodes in a distributed system, potential changes that can cause application failure are prevented from being propagated throughout the distributed system. Consequently, system-wide failures caused by poison pills are therefore prevented by the techniques of the present disclosure.

In an embodiment, the consensus protocol utilizes a two-phase commit mechanism, such as used in various implementations of Paxos. In the first phase, a node in a distributed system proposed a change to a set of data to other nodes in the distributed system. In the first phase (a prepare/promise phase), the node proposing a change communicates with a quorum of nodes in the distributed system. Each node in the quorum responds with a promise to not accept conflicting proposals. Once the proposing node has received confirmation from a quorum, the proposer may proceed to the second phase (an acceptance phase). During the acceptance phase, the proposer may communicate with a quorum of other nodes in the distributed system to cause the nodes to accept the change and propagate the change throughout the distributed system. During the acceptance phase, nodes able to accept a request to change the data may perform an application-level check in accordance with application level logic with which they are configured. As a result, if the proposed change is unacceptable from the perspective of an application that utilizes the data, the acceptance phase will fail and problems caused by a poison pill are thereby avoided.

FIG. 1 shows a diagram with an environment illustrating various aspects of the present disclosure. In an embodiment, the environment includes a distributed system 100. The distributed system may comprise a plurality of computer systems (nodes 102) that communicate with one another over a network, such as the Internet, an intranet, and/or other network or combination of networks. Communication may occur by the passing of electronic messages between nodes.

The computer systems may be configured with executable instructions for performing a role in the distributed system. Roles in the distributed system may vary in accordance with various embodiments. In some examples, different nodes in a distributed system perform redundant roles and, therefore, may be configured with the same or similar executable instructions. In other examples, different nodes in a distributed system may have different roles. As an example, one node may be a web server and another may be an application server, such as described below. Note that, in a distributed system, some pairs of nodes may be redundant and other pairs of nodes may not be redundant. In some examples, a pair of nodes may have partial redundancy where both nodes in the pair may be able to perform some of the same functions while other functions may be performable only by one node in the pair. Note also that, while FIG. 1 shows two nodes 102 for the purpose of simplicity of illustration, a distributed system may have more than two nodes, even hundreds or thousands of nodes.

With respect to a consensus protocol, nodes 102 of the distributed system 100 may have different roles in the consensus protocol. For instance, with respect to Paxos protocols, a node may operate as a client, proposer, an acceptor, leader or a learner. In the example of FIG. 1, a node 102 operates as a proposer that communications by the transmission of an electronic message 104 to an acceptor node 102 (the node 102 illustrated as receiving the message 104). The proposing node 102 may have generated a change to the data that includes value V or may be in the process of processing a request from a client where fulfillment of the request involves updating to the value V, where "V" represents a new value for data in a data set, which may be a new entry in the data set, an update to a preexisting value in the data set, a deletion from a data set or otherwise an update to the data set. The data set may be represented in various ways in accordance with various embodiments, such as an entry in a relational or other database, an entry in a state machine used to represent the state of a system, or otherwise in a manner utilized by the distributed system 102. In a specific example, the data set is a log of events and the value V represents a log entry. A state machine, in an embodiment, comprises an electronic representation of one or more current states of a data set, which may correspond to one or more states of an application that utilizes the data set.

In this this example, the message 104 (also referred to as a proposal or proposal message) to update to value V specifies a number, N, of a proposal, where N, in some embodiments, is a positive integer. The number N may be referred to as a proposal number. In an embodiment, proposal numbers are used in a consensus protocol, such as Paxos (e.g., as described in Lamport, L.: The part-time parliament. Trans. on Computer Systems 16(2) (1998)), Chandra-Toueg (e.g., as described in (Chandra, T., Toueg, S.: Unreliable failure detectors for reliable distributed systems. J. ACM 43(2) (1996)), and Ben-Or (e.g., as described in Ben-Or, M.: Another advantage of free choice: Completely asynchronous agreement protocols. In: Proc. of the 2nd ACM Symp. on Principles of Distributed Computing, Montreal, Quebec, ACM SIGOPS-SIGACT (August 1983)), for the purpose of ensuring data constancy. In an embodiment, the proposing node 102 (also referred to as a proposer or leader) creates the message 104, in part, by determining a value for N. In an embodiment, each node in the distributed system 100 implementing the consensus protocol is configured (e.g., with executable instructions) to reject proposals with a number (identifying number) that is not higher than any previous proposal number of any previous proposals received by the node. As a result, in an embodiment, the proposing node 102 selects N as the next integer or another integer greater than the number used by the proposing node for a previous proposal to ensure that, if the acceptor node 102 rejects the message 104, it is not due to a previous proposal made by the proposing node 102.

In an embodiment, when the acceptor node 102 receives the message 104, the acceptor node 102 performs a set of operations to determine whether to accept the proposal encoded in the message 104. In an embodiment, the acceptor node 102, upon receipt of the message 104, determines whether the proposal complies with a condition of a consensus protocol which, in an example embodiment, includes determining whether the value of the proposal, N, is valid. For example, the acceptor node 102 may determine whether N is greater than any proposal number received from any proposer, previously or otherwise, whether N indicates compliance with any conditions for a consensus protocol being implemented. As illustrated in FIG. 1, in some examples, not only does the acceptor node 102 determine 106 whether N is valid in accordance with a consensus protocol, but the acceptor node 102 determines whether the value V being proposed is valid. Note that a condition may be that the proposal complies with multiple conditions, which may be connected with one or more logical connectors, such as described below.

As noted above, a consensus protocol being implemented by the acceptor node 102 may be agnostic to the actual values of the update. In other words, according to the consensus protocol, the value of V may not play a role in determining whether to update to the value V. As a result, without further application-level processing such as described herein, use of various versions of a consensus protocol could potentially result in acceptance of invalid values or, generally, invalid updates (e.g., invalid transitions between valid states). Accordingly, in an embodiment, the acceptor node performs another determination 108 whether the proposal complies with a condition associated with an application, such as whether value V is valid. As noted above, the determination 108 whether the value V is valid may be an application-level check to determine whether the proposed value for V complies with any conditions. For example, an application may be configured to handle any values of V in a set of possible values. The determination 108 may include checking whether V is in the set of possible values. As another example, an application may be configured to handle a set of valid states tracked by a replicated state machine, a copy of which is available to the application and for which other copies are available to other nodes in the distributed system 100. Note that, for a replicated state machine, replicas of the state machine may not be exact copies of one another, such as when a round of a consensus protocol has not resulted in a change to the data set having fully propagated throughout the distributed system 100. The determination 108 may include checking whether a state resulting from acceptance of the value V is in the set of valid states. Generally, the acceptor node 102 determines 108 whether the value V is valid in accordance with logic for one or more applications that utilize the data set to be updated by the value V. Further note that, while FIG. 1 illustrates the determination 106 of whether N is valid and the determination 108 of whether V is valid as occurring sequentially in a particular order, the determinations may be made in a different order or in parallel. Further, additional determinations may also be made in accordance with various embodiments. As with conditions for a consensus protocol, note that a condition whether the proposal complies with a condition associated with the application may be a condition that the proposal complies with multiple conditions connected together with one or more logical connectors, such as described below.

As illustrated in FIG. 1, in an embodiment, whether determined that both N and V are valid, the acceptor node 102 accepts 110 the value of V and updates accordingly (e.g., by updating the data set and/or state machine). If, however, the acceptor node 102 either determines 106 that N is invalid or determines that V is invalid (or, in some embodiments, that both are invalid), then the acceptor node 102, in an embodiment, rejects (e.g., ignores or explicitly rejects) 112 the value V, thereby influencing whether the value V propagates throughout the distributed system 100. In this manner, poison pills are prevented from being accepted by an acceptor node 102 regardless of whether the poison pill would otherwise be acceptable according to the consensus protocol being implemented.

Figure 2:
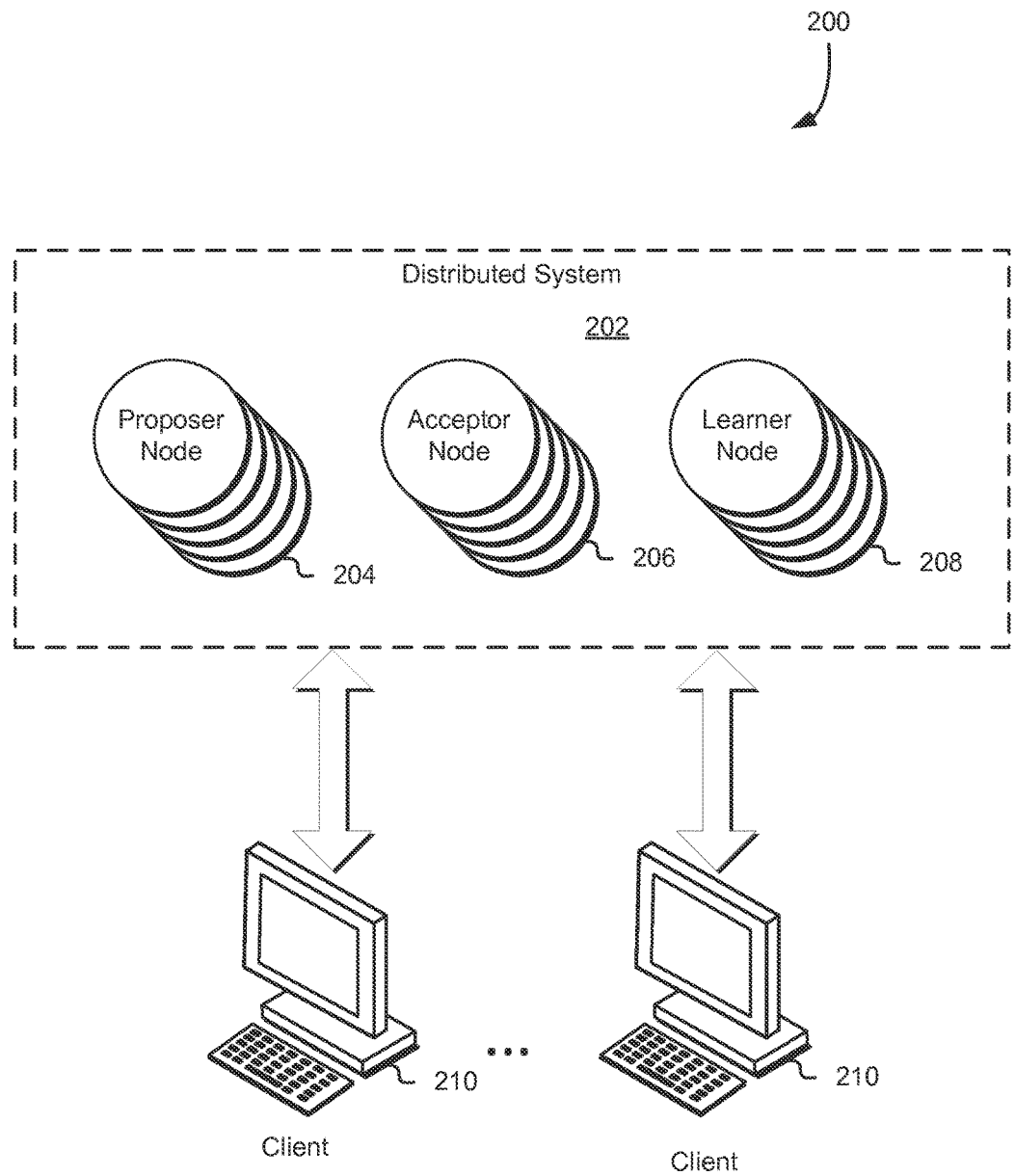
FIG. 2 shows an illustrative example of an environment, which may comprise the environment illustrated in FIG. 1, in which various embodiments may be practiced.

FIG. 2 shows an illustrative example of an environment 200 in accordance with various embodiments. In the environment 200, a distributed system 202, such as the distributed system 100 described above in connection with FIG. 1, operates. As illustrated in FIG. 2, the distributed system 202 comprises a plurality of nodes. In this example, each node in the distributed system plays a role in a consensus protocol. Note that different nodes may play different roles at different times and, in some examples, a single node may play multiple roles. In the example illustrated in FIG. 2, the distributed system 202 includes proposer nodes 204 that play proposer roles, acceptor nodes 206 that play acceptor roles, and learner nodes 208 that play learner roles.

In an embodiment, a proposer node 204 plays a proposer role by proposing changes to a data set utilized by the nodes of the distributed system. For example, a proposer node 202 may create and process a proposal in accordance with a Paxos protocol. A proposer node 202 may be programmed to obtain acceptance of a proposal by a quorum of acceptors which, in an embodiment, is a majority of nodes in the distributed system or a majority of acceptors. An acceptor node 206, in an embodiment, plays an acceptor role by accepting or denying requests in accordance with rules set by a consensus protocol and, as discussed in more detail herein, in accordance with any application-level checks on proposed changes to a data set. An acceptor node 206 may perform additional operations, such as generating and issuing promises in accordance with a Paxos protocol, where a promise is a guarantee that the acceptor node will not accept a proposal with a proposal number less than N, where N is a proposal number for a proposal presented to the acceptor node 206. When an acceptor node 206 accepts a proposal, in an embodiment, the acceptor node transmits a message to each learner in the distributed system 202 to notify each learner of the acceptance. In an embodiment, an acceptor node 206 only issues promises if it is determined that N is higher than any previous proposals that have been presented to the acceptor node 206. A learner node 208, in an embodiment, is a node that learns from an acceptor node 206 that has accepted a proposal. Because the proposer node 202 is configured to obtain acceptance of a proposal from a quorum of acceptors, in typical operation, each learner will receive notification of acceptance of a proposal from a quorum of acceptors at which point the learner will update its memory in accordance with the proposal (e.g., to update to a value V, such as described above).

As illustrated in FIG. 2, the environment 200 includes one or more client computer systems 210 (also referred to as clients). In an embodiment, the distributed system 202 or at least a portion thereof operates a service to which the client computer systems 210 may make calls. For example, one or more nodes of the distributed system 202 may operate as a web server and provide a web service interface accessible to the clients 210 via web service calls. In an embodiment, calls made by the clients 210 include requests whose fulfillment includes updating a data set maintained using a consensus protocol and/or whose submission causes a change to such a data set as a side effect (e.g., due to a log entry entered as a result of the request being submitted, regardless of whether the request was fulfilled).

Figure 3:
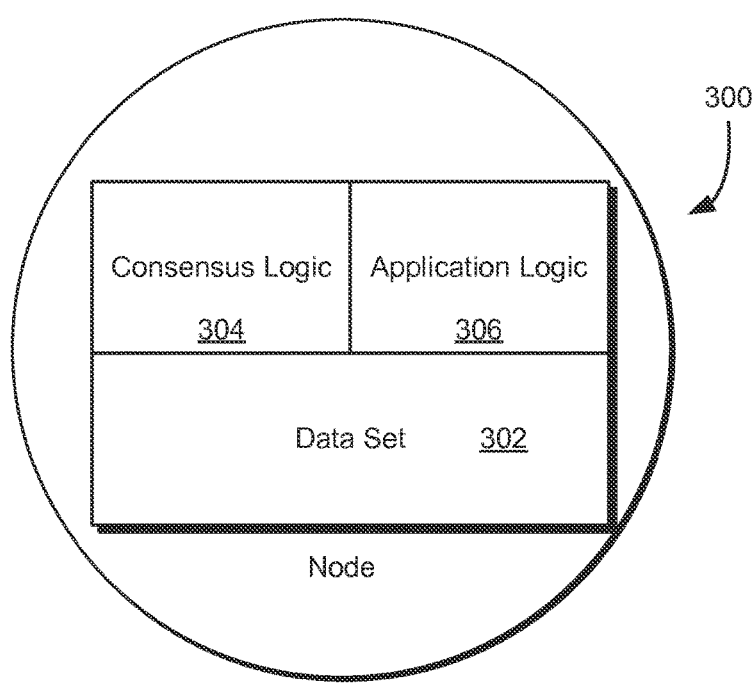
FIG. 3 shows an illustrative example of a configuration of a node in a distributed system in accordance with an embodiment.

FIG. 3 shows an illustrative example of a diagram illustrating a node 300 in a distributed system, such as described above. The node may be implemented by a computer system, such as described below and, therefore, comprise one or more processors and memory that store executable instructions that, when executed by the one or more processors, cause the computer system to perform various operations, such as described herein. As illustrated in this particular example, the node 300 stores a data set 302, such as described above. For example, the data set may be stored in the form of a state machine or set of data for which a consensus protocol is used for the purpose of maintaining consistency of the data throughout a distributed system.

In the implementation illustrated in FIG. 3, the node 300 includes executable instructions in the form of consensus logic 304 and application logic 306. In an embodiment, consensus logic comprises executable instructions that, when executed by the one or more processors of the node 300, cause the node 300 to implement a consensus protocol, such as a Paxos protocol. The consensus logic 306 may, for instance, include executable instructions for playing one or more roles, such as described above. For instance, the consensus logic 306, when executed by the one or more processors, may cause the node 300 to perform a role of an acceptor node where the node 300 accepts proposals on a condition that the proposal be valid both in accordance with any conditions of a consensus protocol being implemented and in accordance with any conditions of an application defined, at least in part, by the application logic 306.

The application logic may comprise executable instructions that, when executed by the one or more processors of the node 300, cause the node 300 to execute one or more applications. An application may be, for instance, a computer program that utilizes data of the data set 302 and that, when executed, causes the node to perform various operations involving data of the data set 302. Note that the application logic may comprise multiple modules of executable code for multiple applications that utilize the same underlying data set 302. In some embodiments, however, the application logic 306 comprises executable code for a single application. Similarly, the consensus logic may comprise multiple modules of executable code for multiple implementations of different consensus protocols, where changes to the data set 302 may require acceptance in accordance with multiple consensus protocols.

In the particular implementation illustrated in FIG. 3, the consensus logic 304 and the application logic 306 are implemented as separate modules. The consensus logic 304 and the application logic 306 may be collectively configured such that the application logic 306 is able to read the data set (e.g., query a state of a state machine) but such that changes to the data set (e.g., changes in a state tracked by the state machine) are processed through the consensus logic 304. The consensus logic 304 may be invoked when execution of the application logic causes a proposed change to the data set 302. The consensus logic 304 may be configured with access to a network interface of the node 302 to verify whether the change can be made, such as by communicating messages to other nodes for the proposes of obtaining promises and other messages in accordance with the consensus protocol being implemented. Similarly, the consensus logic 304 may be configured such that messages from other nodes resulting from execution of corresponding consensus logic on the other nodes are processed in accordance with the consensus logic and, if applicable, such that changes to the data set 302 are made accordingly. After a change to the data set 302 is made in accordance with the consensus logic, such changes may be represented in data read and processed in accordance with the application logic.

As noted above, various embodiments of the present disclosure utilize application-level logic in determinations whether to apply proposed changes to the data set 302. With implementations as illustrated in FIG. 3, such may be accomplished in various ways in accordance with various embodiments. For example, in some embodiments, the consensus logic 304 and application logic 306 are collectively configured such that inter-process communications are passed between processes corresponding to the consensus logic 304 and application logic 306. In such embodiments, a process corresponding to the consensus logic may transmit a proposed value to a process corresponding to the application logic, thereby causing the process corresponding to the application logic to determine whether the proposed value complies with a set of conditions defined in the application logic. The process corresponding to the application logic may communicate to the process corresponding to the consensus logic indicating validity of the value, thereby causing the process corresponding to the consensus logic to accept or reject the proposed value accordingly.

As another example, in an embodiment, the consensus logic 304 and the application logic 306 are configured such that a process corresponding to the application logic 306 communicates rules for validity of values to a process corresponding to the consensus logic 304 such that the process corresponding to the consensus logic 304 determines, in accordance with the received rules, whether a proposed value is valid. Note that determining whether a proposed value is valid, whether performed by a process corresponding to the consensus logic 304, a process corresponding to the application logic 306, or otherwise, may be based at least in part on the underlying data set for which the value is proposed. As noted, for instance, the underlying data set may be maintained in the form of a state machine and whether a proposed value of V is valid may depend on a current state recorded by the state machine. In other words, for some valid states, a given value of V may be valid while, for some other states, the same value of V would be invalid. Such may be the case, for instance, when acceptance of the value V would result in an invalid transition from one state to another, regardless of the validity of the current state and the state that would result from accepting the value V. Note that other variations are also considered as being within the scope of the present disclosure, including variations where other processes not discussed above are responsible for at least a portion of determining the validity of a proposal made as part of a consensus protocol.

Figure 4:
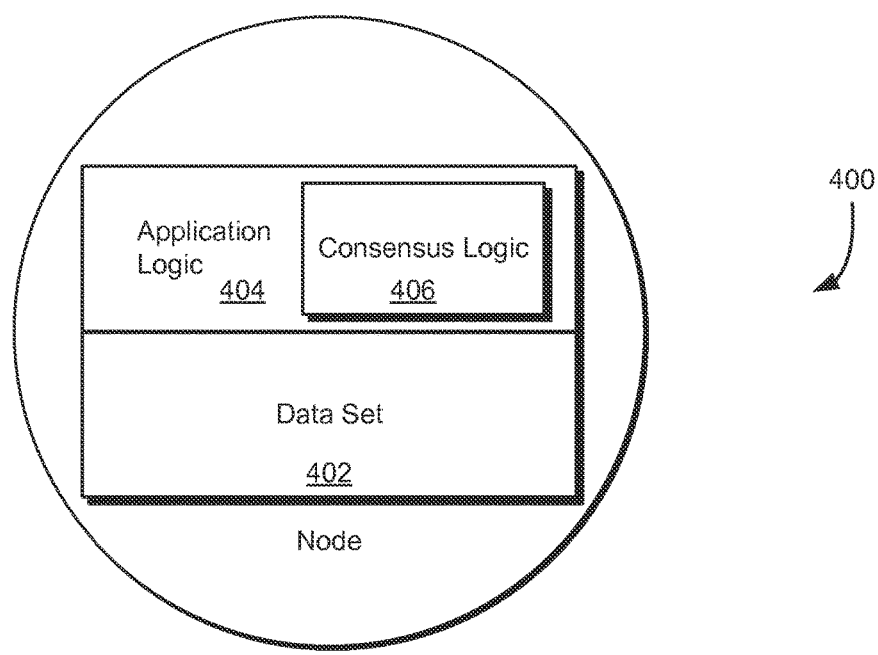
FIG. 4 shows another illustrative example of a configuration of a node in a distributed system in accordance with an embodiment.

FIG. 4 shows a diagram illustrating a node 400 that is configured similarly to, but different from, the node 300 discussed above in connection with FIG. 3. In this particular example, the node 400 may be a computer system with one or more processors and memory that stores executable instructions that, when executed by the one or more processors, cause the computer system to perform various operations, such as described herein. As with the node 300 discussed above in connection with FIG. 3, the node 400 may be one of multiple nodes in a distributed system. In the example implementation illustrated in FIG. 4, the node 400 stores a data set 402, which may be in the form of a state machine or otherwise, such as described above.

Further, as illustrated in FIG. 4, the node 400 stores executable instructions in the form of application logic 404 for execution of an application by the node 400. In this particular implementation, the application logic includes consensus logic 406 that includes executable instructions for implementation of one or more consensus protocols, such as a Paxos protocol. In contrast with the implementation illustrated in FIG. 3, the consensus logic 406 is integrated with the application logic 404. The application logic 404 may be configured, for example, with a subset of executable instructions comprising the consensus logic. The consensus logic 406 may be, for instance, a sub-module of a module that includes the application logic. In some examples, the consensus logic 406 integrated with the application logic 404 is configured with instructions for performing both consensus-protocol level checks on proposals as well as application-level checks on proposals to determine whether to accept a proposal for an update to the data set 402. Note, however, that the logic for performing the various checks required for acceptance of a proposal may be distributed throughout different modules of the application logic and that specific implementations may vary in general.

As noted, numerous variations of the nodes discussed above in connection with FIG. 3 and FIG. 4 are considered as being within the scope of the present disclosure. For instance, FIGS. 3 and 4 illustrate consensus logic and application logic to be collocated on the same computing device. However, in some embodiments, the application logic and consensus logic may be on different computing devices. For example, a separate service accessible via a network (e.g., via a web service interface) may be used to provide application-level check on proposed changes to a data set. Such a service may be accessible to only a single node or accessible to multiple (perhaps all) nodes of the distributed system. In such an embodiment, checks on the validity of a proposed change may involve submission of requests over a network and receipt and processing of responses to such requests.

Figure 5:
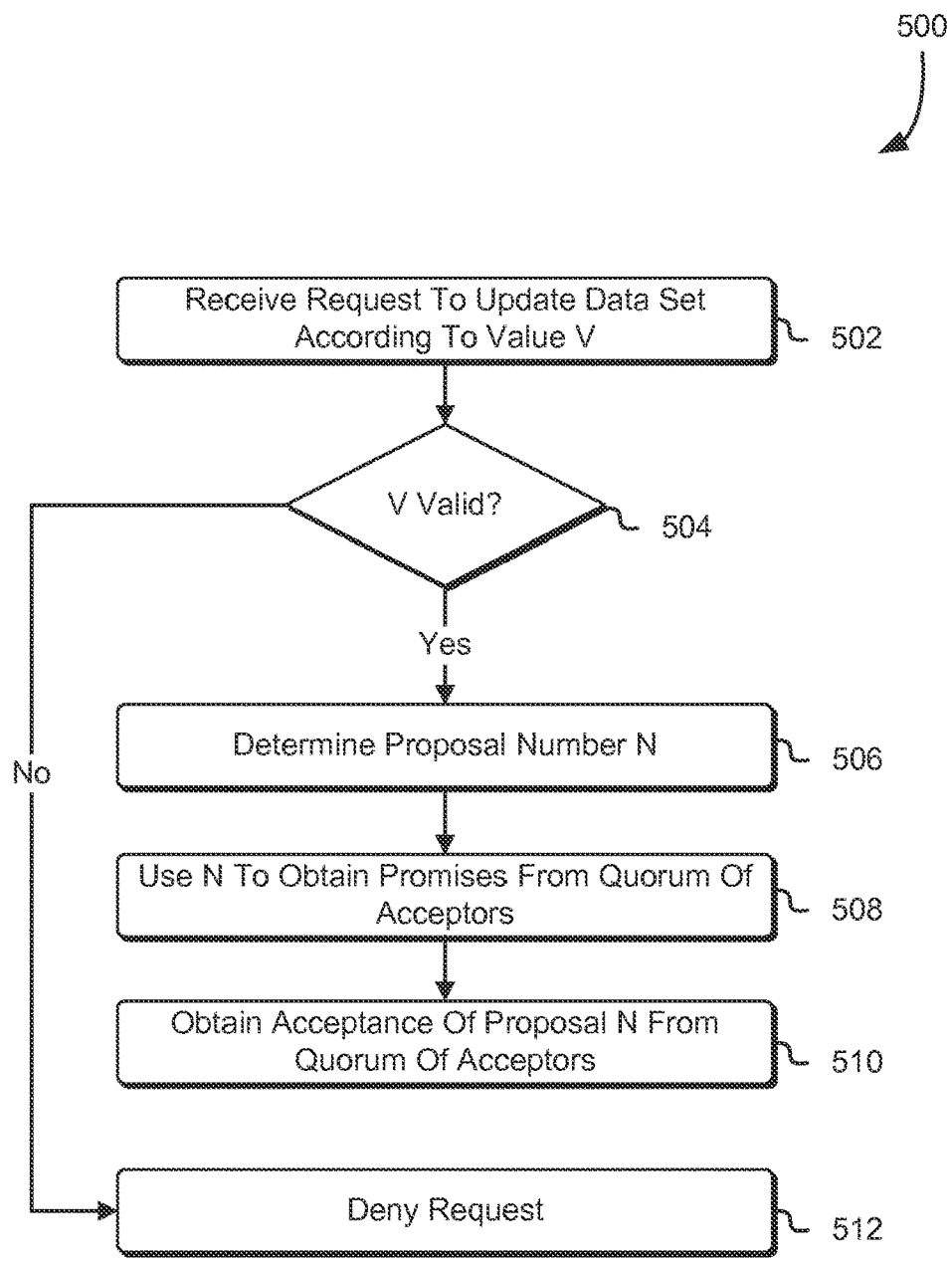
FIG. 5 shows an illustrative example of a process for updating a data set of a distributed system in accordance with an embodiment.

FIG. 5 shows an illustrative example of a process 500 for updating a data set in accordance with an embodiment. The process 500 may be performed by any suitable system, such as by a computer system operating as a node in a distributed system. The system performing the process 500 may be, for instance, configured to perform the role of a proposer in a distributed system that uses a Paxos protocol for maintaining a data set consistent across nodes of the distributed system. The system performing the process 500 may be configured with executable instructions that, when executed by one or more processors of the system, cause the system to perform the operations discussed below.

In an embodiment, the process 500 includes receiving 502 a request to update a data set to a value V, such as described above. The system performing the process 500 may, for instance, have received a request from a client computer system where successful fulfillment of the request from the client computer system involves updating the data set to the value V. Generally, the request to update the data set to value V is any communication that causes an attempt to update the data set to value V, whether the request is an explicit request to update using the value V or whether updating to the value of V is a side effect (e.g., a log entry or change of state in a state machine tracking one or states) of a request whose primary purpose does not explicitly involve V.

In an embodiment, the process 500 includes determining 504 whether V is valid in accordance with application-level logic. The manner in which it is determined 504 whether V is valid may vary in accordance with various embodiments, such as in accordance with the structure of the data set, the use of the data set by a corresponding application, or otherwise. For example, a determination may be made based at least in part on the value of V itself, such as by determining whether V is in a set of values specified as acceptable, where the set may be specified by listing the values explicitly, by specifying characteristics that define the set, or otherwise. As another example, the determination 504 may be made based at least in part on an effect of updating the data set according to the value V. As noted above, updating the data set to the value V may cause an invalid state or an invalid transition between states. To determine whether V is valid, in some examples, the system performing the process 500 is configured to operate a rules engine to apply a set of rules regarding the validity of proposed changes to the data set. The rules may collectively define a set of conditions determinative of whether a proposed change to the data set is valid. The set of conditions, in some examples, contain multiple conditions joined together with Boolean operators (logical connectors, also referred to as logical connectives) such as AND, OR, and NOT.

In an embodiment, if the system performing the process 500 determines 504 that V is valid, the system determines 506 a proposal number N. In a Paxos implementation, for example, the proposal N may be the next integer higher than the greatest proposal number that the system has recorded (e.g., either by having made an earlier proposal or by having learned and/or accepted a proposal from another system). Note, however, that integer sequences for proposals are only an illustrative example and other ways of sequencing proposals for a consensus protocol can be used. Further, some consensus protocols may not sequence proposals but use another mechanism for ensuring consensus among the nodes of the distributed system of which the system performing the process 500 is a node. As such, an identifier of a proposal (such as a proposal number or other identifier) may be used and the operations described herein may be adapted accordingly.

Having determined 506 the proposal number N, the system performing the process 500 may use the proposal number N to obtain promises from a quorum of acceptors (e.g., other nodes performing acceptor roles, such as described above). In embodiments where a Paxos protocol is used, obtaining a promise from an acceptor may comprise generating a prepare message containing the proposal number to the acceptor, where the prepare message is a message configured to cause an acceptor node to determine whether to generate a promise if N is valid in accordance with the protocol and, if valid, return a promise. The promise may be a message configured to indicate that the acceptor node is to not accept any proposals with proposal number less than N. A quorum, in an embodiment, is a number of acceptors required by a consensus protocol to accept a proposed change to a data set before the change will be committed to the data set. In some embodiments, a quorum is a majority of nodes in the distributed system, which, in some implementations, results in consistency of the data set due to the inability of a single node from accepting conflicting proposals, thereby ensuring that two conflicting proposed changes cannot both be accepted by a majority of notes. Note, however, that quorums may be defined in other ways in accordance with various embodiments, which may depend on the particular consensus protocol being implemented, the strength of any data constancy guarantee desired, and/or other factors. For example, in some embodiments, a quorum may be more than a majority while, in other embodiments, a quorum may be less than a majority. In some instances, quorums may be dynamically determined by a set of quorum rules, which may depend on various factors, such as the particular change to be made, the identities of the nodes to make up a quorum, and/or other factors.

Having obtained 508 promises from a quorum of acceptors, the process 500 may include obtaining 510 acceptance of the proposal N from a quorum of acceptors, which may be the same quorum from which promises were obtained 508. In a Paxos implementation, for example, obtaining acceptance of the proposal N from the quorum of acceptors may include transmitting an accept request to each node in the quorum. An acceptance request may be a message configured to cause a node in the quorum to update its copy of the data set in accordance with the proposal and notify every learner node in the distributed system. In this manner, learner nodes may receive a quorum of notifications from the quorum of acceptors and propagate the change throughout the distributed system.

Returning to the determination 504 whether the value V is valid, if the determination 504 is that the value of V is not valid, the process 500 may include denying 512 the request, which may include transmitting a message to the system that originated the request indicating the denial, ignoring (i.e., taking no further action with) the request, or otherwise operating in a manner that does not update the data set to the value V.

Note that the process 500 is an illustrative example of a way of causing an update to a data set and that other ways of updating the data set may be used in accordance with various embodiments. For example, as illustrated in FIG. 5, the system performing the process 500 determines 504 whether V is valid, thereby causing the system to not attempt to update the data set for invalid values of V, thereby preventing unnecessary usage of computing resources (computational power, bandwidth, etc.) by the distributed system. However, a system may perform the process 500 without determining 504 whether the value V is valid. The consensus protocol being implemented may nevertheless successfully result in consistency of the data set by acceptor nodes themselves accepting proposals on a condition that the value of V is valid.

Other variations of the process 500 are also considered as being within the scope of the present disclosure. For example, for the purpose of clarity of certain concepts, operations that may be performed by a system performing the process 600 are omitted from the figure. For instance, a system performing the process 500 may not be able to obtain a quorum of promises or may not be able to obtain acceptance from the quorum. Such inability may occur, for instance, as a result of failures in a network (e.g., a network partition) or as a result of other activity in the distributed system, such as another node proposing a conflicting value that causes some acceptor nodes to reject a prepare message or an accept request. Accordingly, a system performing the process 500 may include logic for handling such situations. Generally, as with all processes discussed and illustrated herein, additional operations different from those explicitly discussed may also be performed.

Figure 6:
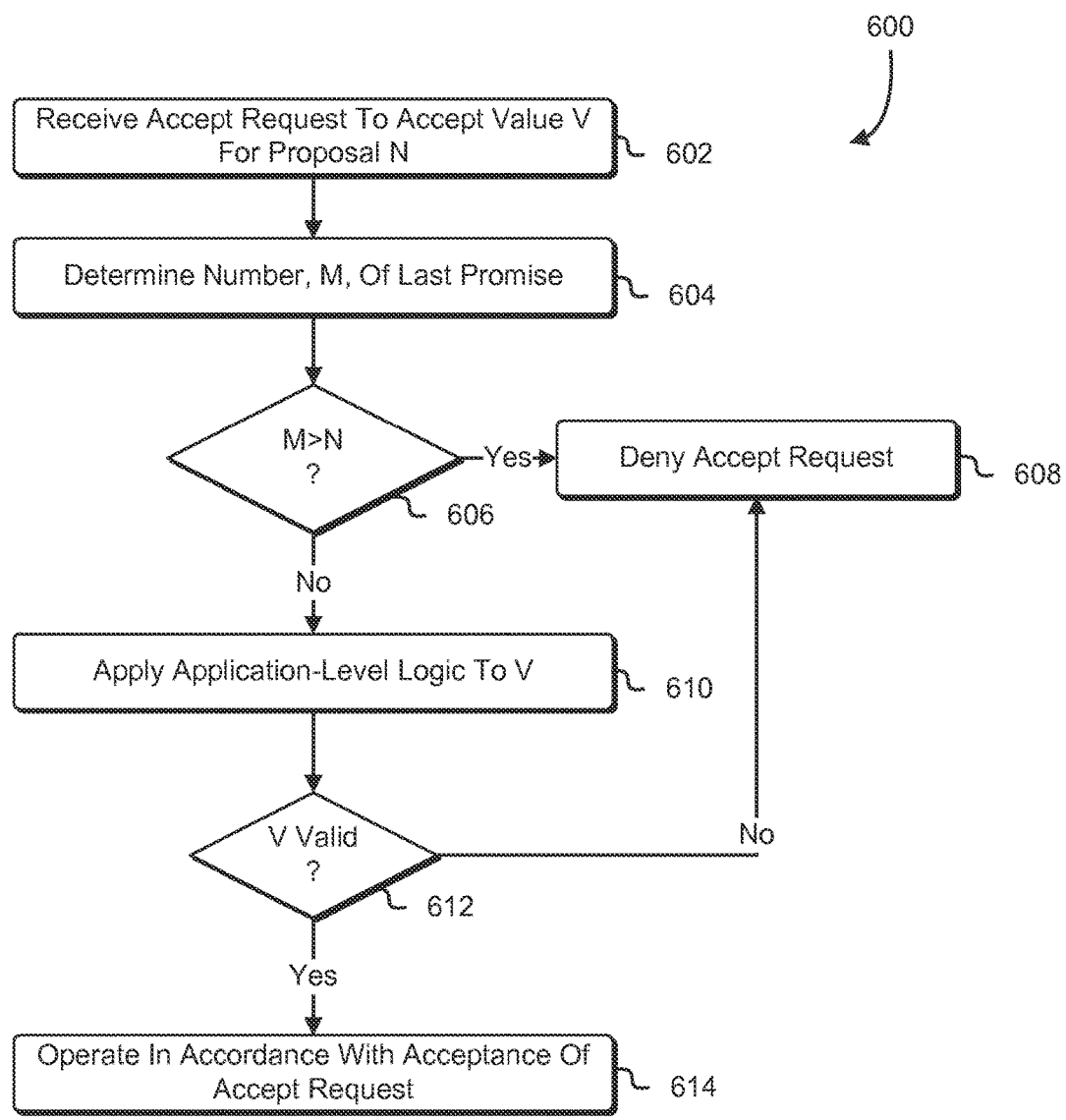
FIG. 6 shows an illustrative example of a process for evaluating a proposal to update a data set of a distributed system in accordance with an embodiment.

FIG. 6 shows an illustrative example of a process 600 for processing a request to update a data set in accordance with an embodiment. The process 600 may be performed by any suitable system, such as an acceptor node as described above. A computer system, for instance, may be configured with executable instructions that, when executed by one or more processors of the computer system, cause the computer system to perform operations discussed in connection with FIG. 6. For example, as with the process 500 discussed above in connection with FIG. 5, the process 600 may be performed by a node configured such as described above in connection with FIG. 3 or FIG. 4.

In an embodiment, the process 600 includes receiving 602 and accept request for a proposal with proposal number N. An accept request may be an accept request in accordance with a Paxos protocol or, generally, a request from one node to another to accept a proposal for a change to a data set. The request may be received over a network over which the nodes communicate, such as an intranet (internal private network) or the Internet or a combination of networks. To process the received 602 accept request, a system performing the process 60 may determine 604 a number, M, of a last promise issued from the system performing the process 600 (or, if the system performing the process 600 has not yet issued a promise, a default value, such as zero). In some examples, M is a positive integer, although other ways of ordering promises for the purpose of a consensus protocol are considered as being within the scope of the present disclosure.

In this example implantation illustrated in FIG. 6, the system performing the process 600 initially checks the validity of the accept request by determining 606 whether the proposal M is greater than N, that is whether the system performing the process 600 has not already previously issued a promise to only consider proposals with a number greater than N. In other words, the system performing the process 600 determines whether it has issued a promise to only consider proposals with number greater than N and operates accordingly. For example, if the system determines 606 that N is less than M, then the process 600 may include denying 608 the accept request. In some examples, denying 608 the accept request includes ignoring the accept request (that is, operating so as to not further the proposal encoded in the accept request). In other examples, the system may deny 608 the accept request by transmitting to the node that issued the accept request a message indicating the denial, thereby enabling the node to operate accordingly, such as by ceasing communications in connection with the proposal having number N.

If, however, the system performing the process 600 determines 606 that N is not less than M, then the process 600 may include applying 610 application-level logic to the value V, such as described above. For example, the system may apply a rules engine to determine whether V is an acceptable value for the data set to be updated by fulfillment of the accept request. As noted, such processing may include determining whether V is in a set of acceptable values, whether V would result in an unacceptable state, and/or whether V would result in an unacceptable transition between two states (which themselves may be valid states).

Having applied the application-level logic to the value V, the system performing the process 600 may determine 610 whether a result of application of the application-level logic indicated that V is valid or invalid. If determined 612 that the value V is invalid, the process 600 may include denying 608 the accept request, such as discussed above. If, however, the system determines 612 that the value V is valid, the process 600 may include operating 614 in accordance with acceptance of the accept request, that is, in accordance with fulfillment of the accept request in accordance with the particular consensus protocol being utilized. For example, in accordance with a Paxos protocol, the system performing the process 600 may register the value V (e.g., by updating a state machine redundantly stored among nodes or otherwise updating the data set) and send a message (e.g., an accepted message) indicating acceptance of the value V to the proposer node (i.e., the node that submitted the accept request that was received 602) and to every learner in the distributed system. Generally, any way by which influencing the distributed system toward acceptance of the value V is considered as being within the scope of the present disclosure.

Figure 7:
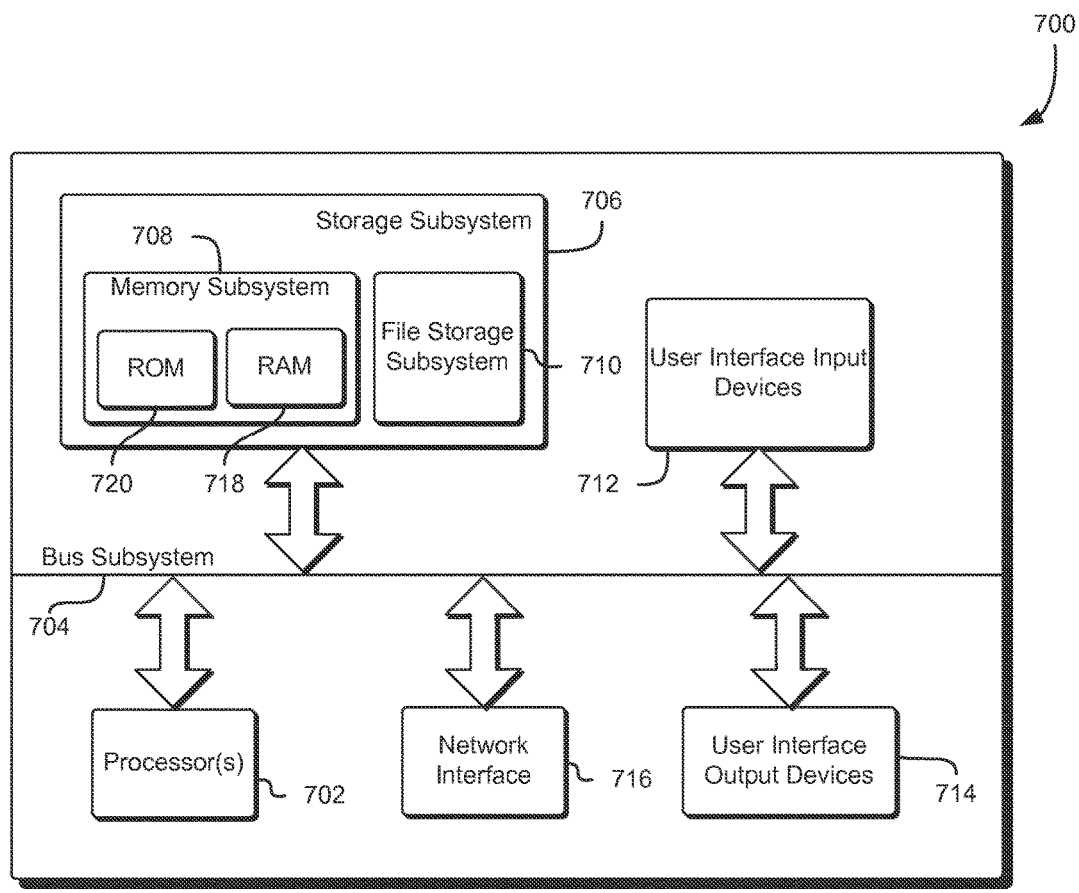
FIG. 7 shows an illustrative example of a computer system that can implement various techniques described herein.

FIG. 7 shows an illustrative example of a computer system that may be used to implement the various techniques described herein and variations thereof. In various embodiments, the computer system 700 may be used to implement any of the systems illustrated herein and described above. For example, the computer system 700 may be used to operate as a node in a distributed system that utilizes a consensus protocol, such as a Paxos protocol, for the purpose of ensuring the consistency of data shared by nodes in the distributed system. As shown in FIG. 7, the computer system 700 may include one or more processors 702 that may be configured to communicate with and are operatively coupled to a number of peripheral subsystems via a bus subsystem 704. These peripheral subsystems may include a storage subsystem 706, comprising a memory subsystem 708 and a file storage subsystem 710, one or more user interface input devices 712, one or more user interface output devices 714, and a network interface subsystem 716.

The bus subsystem 704 may provide a mechanism for enabling the various components and subsystems of computer system 700 to communicate with each other as intended. Although the bus subsystem 704 is shown schematically as a single bus, alternative embodiments of the bus subsystem may utilize multiple busses.

The network interface subsystem 716 may provide an interface to other device systems and networks. The network interface subsystem 716 may serve as an interface for receiving data from and transmitting data to other systems from the computer system 700. For example, the network interface subsystem 716 may enable other nodes of the distributed system to communicate with the computer system 700 for the purpose of passing messages according to a consensus protocol. Further, the network interface subsystem 716 may be used to receive requests from client computer systems where the fulfillment of the request may cause an update to a data set to be made using a consensus protocol.

The user interface input devices 712 may include one or buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device 700. Note that, in many examples, the computer system 700 may lack input devices during its operation, at least some of the time. For instance, computer system 700 may be a sever in a server rack in a data center without any input devices connected to the computer system 700.

User interface output devices 714 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device 700. The output device(s) 714 may be used, for example, to present user interfaces to facilitate user interaction with applications performing processes described herein and variations therein, when such interaction may be appropriate. Note that, as with input devices, the computer system 700 may lack any output devices 714 during at least some of its operation.

The storage subsystem 706 may provide a computer-readable storage medium (which may be non-transitory) for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 706. These applications may include, for instance, consensus logic and application logic, such as described above. These application modules or instructions may be executed by the one or more processors 702. The storage subsystem 706 may additionally provide a repository for storing data used in accordance with the present disclosure. The storage subsystem 706 may comprise a memory subsystem 708 and a file/disk storage subsystem 710. In some examples, the storage subsystem 706 stores the data set that is maintained using a consensus protocol.

The memory subsystem 708 may include a number of memories (memory units) including a main random access memory (RAM) 718 for storage of instructions and data during program execution and a read only memory (ROM) 720 in which fixed instructions may be stored. The file storage subsystem 710 may provide a non-transitory persistent (non-volatile) storage for program and data files, and may include a hard disk drive, a floppy disk drive along with associated removable media, a Compact Disk Read Only Memory (CD-ROM) drive, a digital video disk (DVD) drive, another optical drive, removable media cartridges, and other like storage media.

The device 700 may be of various types including a portable computer device, tablet computer, a workstation, a server, or any other data processing system. Additionally, the device system 700 may include another device that may be connected to the device 700 through one or more ports (e.g., USB, a headphone jack, Lightning connector, etc.). The device that may be connected to the device 700 may include a plurality of ports configured to accept fiber-optic connectors. Accordingly, this device may be configured to convert optical signals to electrical signals that may be transmitted through the port connecting the device to the device 700 for processing. Due to the ever-changing nature of computers and networks, the description of the device 700 depicted in FIG. 7 is intended only as a specific example for purposes of illustrating the preferred embodiment of the device. Many other configurations having more or fewer components than the system depicted in FIG. 7 are possible.

Figure 8:
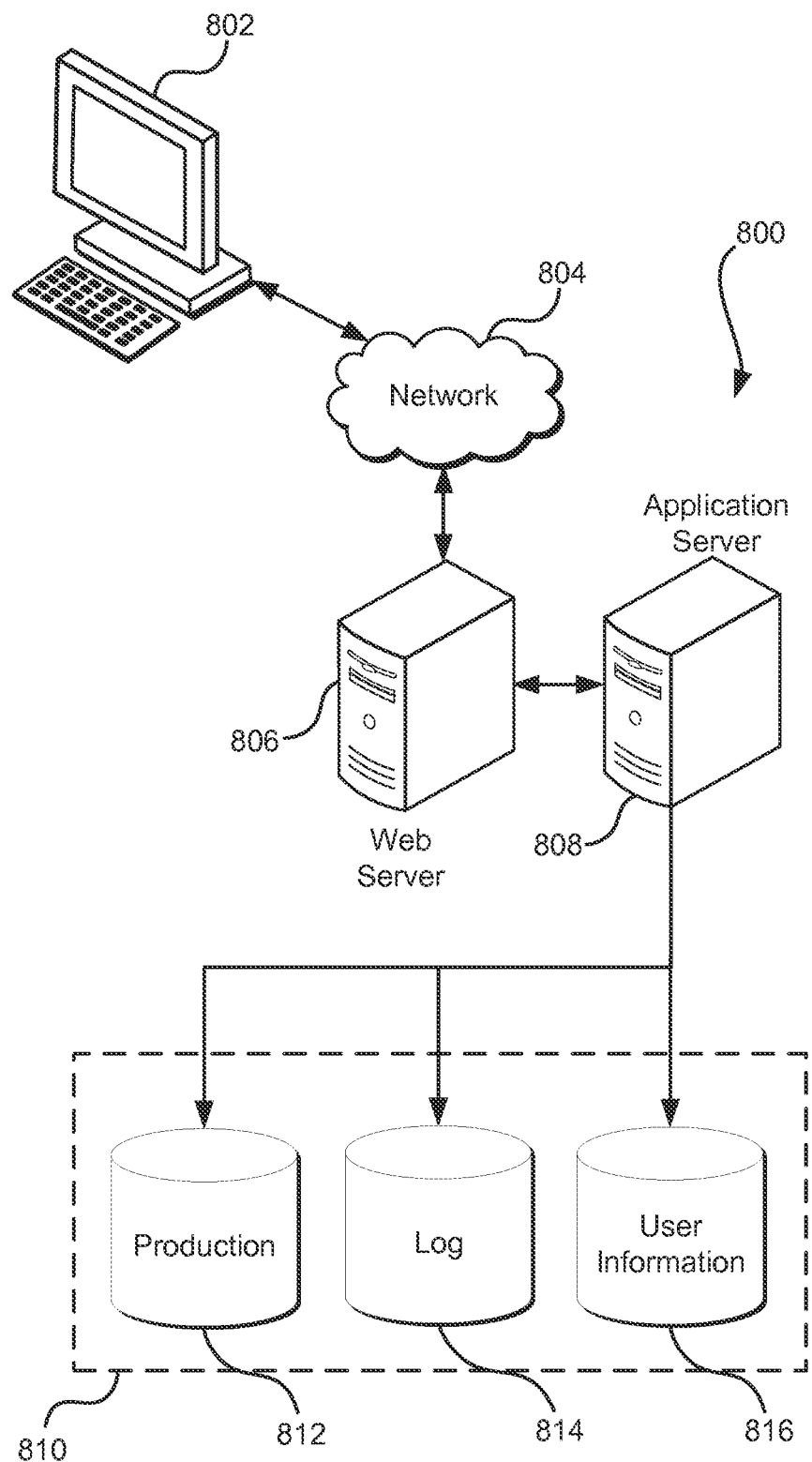
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a node in a distributed system, a request to apply an update to a data set, the data set having multiple copies distributed among nodes of the distributed system;
    verifying, by a first process of a consensus protocol, that the update complies with a first condition of the consensus protocol used by the distributed system for agreement on changes to the data set;
    verifying that the update complies with a second condition for an application by at least providing, by the first process, the update to a second process executing that application, where the second process verifies the update complies with the second condition, the application comprising executable instructions for performing operations in connection with the data set and defining a set of conditions for the application of which the second condition is a member;
    as a result of the update complying with the first condition and the second condition, updating a local copy of the multiple copies of the data set in accordance with the update; and
    notifying a set of other nodes of the distributed system of acceptance of the update.

2. The computer-implemented method of claim 1, wherein:
    each copy of the multiple copies represents the data set as a copy of a state machine; and
    updating the local copy includes modifying a local copy of the state machine to modify a state tracked by the local copy of the state machine.

3. The computer-implemented method of claim 2, wherein the second condition prevents at least one invalid state or at least one invalid transition between states.

4. The computer-implemented method of claim 1, wherein the consensus protocol is a Paxos protocol.

5. A system, comprising:
    one or more processors; and
    memory including instructions that, upon execution by the one or more processors, cause the system to:
        obtain a proposal for an update to a data set;
        determine, by a first process of a consensus protocol, that the proposal complies with a first condition of the consensus protocol;
        determine that the proposal complies with a second condition associated with an application by at least providing, by the first process, the update to a second process associated with the application for verification that the update complies with the second condition;
        determine that the proposal complies with both the first condition and the second condition; and
        accept the proposal based on determining that the proposal complies with both the first and second condition.

6. The system of claim 5, wherein the instructions comprise a first set of instructions for determining compliance with the first condition and a second set of instructions for determining compliance with the second condition.

7. The system of claim 5, wherein the data set is replicated across multiple nodes of a distributed system of which the system is a node.

8. The system of claim 5, wherein the proposal to update the data set is an accept request of a Paxos protocol.

9. The system of claim 5, wherein:
    the system comprises a set of acceptor nodes and a set of learner nodes, each acceptor node of the set of acceptor nodes enforces the second condition for the application; and
    the instructions that cause the system to accept the proposal, upon execution by the one or more processors, cause at least one acceptor node to transmit a notification of acceptance to each learner node of the set of learner nodes.

10. The system of claim 5, wherein:
    the proposal has a proposal number; and
    compliance with the first condition is based at least in part on the proposal number relative to another proposal number.

11. The system of claim 5, wherein:
    the second condition for the application, when applied to the proposal, prevents acceptance of the proposal by the system as a result of the proposal being for an invalid change in a state of the data set.

12. The system of claim 5, wherein the data set is represented in a distributed system utilizing the consensus protocol as a replicated state machine.

13. The system of claim 5, wherein:
    the system comprises a proposer node; and
    the instructions further include instructions that, as a result of being executed by the one or more processors, cause the system to generate the proposal as a result of the second condition being satisfied.

14. A non-transitory computer-readable storage medium having stored thereon executable instructions that, upon execution by one or more processors of a computer system, cause the computer system to:
    obtain a proposal, from another computer system and in accordance with a consensus protocol, to make a proposed change to a data set;
    evaluate the proposal based at least in part on the proposed change by at least evaluating, by a first process associated with the consensus protocol, the proposal based at least in part on a first set of conditions associated with the consensus protocol and evaluating a second set of conditions associated with the data set defined in an application by at least causing the first process to provide the proposed change to a second process associated with the application; and
    as a result of successful evaluation of the proposed change against the first set of conditions and the second set of conditions, determine to influence acceptance of the proposed change in a distributed system.

15. The non-transitory computer-readable storage medium of claim 14, wherein the executable instructions further comprise instructions that, upon execution by the one or more processors, cause the computer system to further evaluate the proposal based at least in part on information in the proposal different from the proposed change.

16. The non-transitory computer-readable storage medium of claim 15, wherein the information different from the proposed change is an identifier of the proposal.

17. The non-transitory computer-readable storage medium of claim 14, wherein:
the data set is represented by a state machine; and
the executable instructions that cause the computer system to evaluate the proposal are based at least in part on whether application of the proposed change would result in the state machine indicating an invalid state.

18. The non-transitory computer-readable storage medium of claim 14, wherein:
the data set is represented by a state machine; and
the executable instructions that cause the computer system to evaluate the proposal are based at least in part on whether application of the proposed change would result in an invalid transition between valid states tracked by the state machine.

19. The non-transitory computer-readable storage medium of claim 14, wherein the executable instructions that cause the computer system to evaluate the proposal, upon execution by the one or more processors, cause the computer system to reject the proposed change if the proposed change is invalid based at least in part on the first set of conditions associated with the consensus protocol or the second set of conditions associated with the data set.

20. The non-transitory computer-readable storage medium of claim 14, wherein the executable instructions that cause the computer system to influence acceptance of the proposed change in the distributed system, upon execution by the one or more processors, cause the computer system to, on a condition that the evaluation of the proposed change indicates that the proposed change is valid, transmit a notification of acceptance of the proposed change to a plurality of nodes in the distributed system.

21. The non-transitory computer-readable storage medium of claim 14, wherein the executable instructions further comprise instructions that, upon execution by the one or more processors, cause the computer system to update a local copy of the data set on a condition that the evaluation of the proposed change indicates that the proposed change is valid.

* * * * *